United States Patent
Chamberlain et al.

(10) Patent No.: US 6,236,746 B1
(45) Date of Patent: *May 22, 2001

(54) METHOD TO EXTRACT CIRCUIT INFORMATION

(75) Inventors: George Chamberlain, Kanata; Alexi Ioudovski; John-Scott Thomas, both of Ottawa; Ghassan Naim, Ontario, all of (CA)

(73) Assignee: Semiconductor Insights, Inc., Kanata (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/942,113

(22) Filed: Oct. 1, 1997

Related U.S. Application Data

(60) Provisional application No. 60/027,172, filed on Oct. 1, 1996.

(51) Int. Cl.$^7$ ............................. G06K 9/00; G06K 9/32
(52) U.S. Cl. ........................................... 382/145; 382/294
(58) Field of Search ..................... 382/140, 141, 382/145–148, 151, 284, 294; 348/87, 95–96, 126; 364/488, 489–491

(56) References Cited

U.S. PATENT DOCUMENTS

| | | | |
|---|---|---|---|
| 4,001,840 | * | 1/1977 | Becker et al. ........................ 346/762 |
| 4,387,304 | * | 6/1983 | Younkin ............................. 250/492.2 |
| 4,467,211 | | 8/1984 | Smith et al. ....................... 250/492.2 |

(List continued on next page.)

OTHER PUBLICATIONS

Mital, Dinesh, "An Automatic Circuit Extractor From A Photo–Micrograph of Integrated Circuits," School of Electrical and Electronic Engineering, Nanyang Technological University, Singapore, IEEE TENCON'93/Beijing, pp. 319–323.

Barney, John, "Computer–Aided Reverse Engineering (CARE)* of ASICS: A New Way to Provide Test Vestors for Depot Repair Services and Create a New Source for Obsolete or Hard to Get Integrated Circuits," Bellevue, pp. 384–387.

Bafleur, et al., "Reliability Assessment of Integrated Circuits Through Reverse Engineering Techniques," Microelectronics Journal, vol. 17, No. 4, Luton, 1986, pp. 11–26.

Blythe, et al., "Layout Reconstruction of Complex Silicon Chips," IEEE Journal of Solid–State Circuits, vol. 28, No. 2, Feb. 1993, pp. 138–145.

Bourbakis, et al., "Specifications for the Developement of an Expert Tool for the Automatic Optical Undrstanding [sic] of Electronic Circuits: VLSI Reverse Engineering," 1991 IEEE VLSI Test Symposium, 1991, pp. 98–103.

(List continued on next page.)

Primary Examiner—Jose L. Couso
Assistant Examiner—Duy M. Dang
(74) Attorney, Agent, or Firm—Sterne, Kessler, Goldstein & Fox, P.L.L.C.

(57) ABSTRACT

A method for analyzing an integrated circuit (IC). At least a portion of a layer of the IC is scanned using high magnification, to obtain images of the IC. The images are registered to create a mosaicked image. An IC layout database is created in the form of a set of polygons from the mosaicked image, where the step of creating the IC layout database is performed after, or pipelined with, the registering step. The process is repeated for plural IC layers, as necessary. Polygon sets from each layer are vertically registered into alignment with minimal distortion. A netlist or schematic diagram is generated to represent the scanned IC portion based on the registered set(s) of polygons.

25 Claims, 2 Drawing Sheets

U.S. PATENT DOCUMENTS

| | | | |
|---|---|---|---|
| 5,016,080 | 5/1991 | Giannella | 357/45 |
| 5,086,477 | 2/1992 | Yu et al. | 382/141 |
| 5,097,422 | 3/1992 | Corbin, II et al. | 364/491 |
| 5,170,441 | 12/1992 | Mimura et al. | 382/295 |
| 5,191,213 | 3/1993 | Ahmed et al. | 250/310 |
| 5,258,919 | 11/1993 | Yamanouchi et al. | 364/489 |
| 5,463,561 * | 10/1995 | Razdan | 364/489 |
| 5,541,849 | 7/1996 | Rostoker et al. | 364/489 |
| 5,598,344 | 1/1997 | Dangelo et al. | 364/489 |
| 5,638,291 | 6/1997 | Li et al. | 364/490 |
| 5,689,432 | 11/1997 | Blaauw et al. | 364/490 |
| 5,694,481 * | 12/1997 | Lam et al. | 382/145 |
| 5,751,596 | 5/1998 | Ginetti et al. | 364/491 |
| 5,764,525 | 6/1998 | Mahmood et al. | 364/488 |
| 5,812,412 | 9/1998 | Moriizumi et al. | 364/488 |
| 5,812,416 | 9/1998 | Gupte et al. | 364/490 |
| 5,818,727 | 10/1998 | Sekiguchi | 364/490 |
| 5,820,561 * | 10/1998 | Olstad et al. | 600/453 |
| 5,901,063 | 5/1999 | Chang et al. | 364/488 |
| 5,905,654 | 5/1999 | Tanino et al. | 364/491 |
| 5,943,487 | 8/1999 | Messerman et al. | 395/500.12 |

OTHER PUBLICATIONS

Kiang, Tan Ooi, et al., "Extracting Layers From Optical Images of Silicon Integrated Circuit Chips," Centre for Signal Processing, School of Electrical & Electronic Engineering, Nanyang Technological Unviersity, Singapore, pp. 571–575.

Kiang, Tan Ooi, et al., "Colour Image Segmentation of Layer Patterns on Silicon Integrated Circuit Chips," Centre for Signal Processing, School of Electrical & Electronic Engineering, Nanyang Technological University, Singapore, pp. 707–711.

Tan, et al., "An Automatic Layer Extractor of IC Chips," School of Electrical & Electronic Engineering, Nanyang Technological University, Singapore, pp. 1346–1349.

Gattiker, et al., "Visual Reverse Engineering Using SPNs for Automated Testing and Diagnosis of Digital Circuits," Binghamton University, Dept EE/AAAI lab, Binghamton, 1995, pp. 236–242.

U.S. application No. 08/939,047, Chamberlain et al. filed Sept. 26, 1997.

Young–Uk Yu, "VLSI Design and CAD Technology in Korea," Valid Logic Systems, IEEE Design & Test of Computers, Oct. 1989, pp. 29–39.

Hild, et al., "Optical Preprocessing as Inspection Tool?," Optik 99, No. 3, 1995, pp. 123–133.

Khalaj, et al., "Digital Image Processing Techniques for Patterned Wafer Inspection," Information Systems Laboratory, Department of Electrical Engineering, Stanford University, SPIE, vol. 1926, pp. 508–516.

Yuan, et al., "A Production System for LSI Chip Anatomizing," Pattern Recognition Letters 5, North–Holland, 1987, pp. 227–232.

* cited by examiner-

METHOD TO EXTRACT CIRCUIT INFORMATION

This application is a continuation of application Ser. No. 60/027,172 filed Oct. 1, 1996.

This invention relates to the field of semiconductor integrated circuit structure analysis.

BACKGROUND OF THE INVENTION

In the intensely competitive field of microelectronics, detailed analysis of a semiconductor integrated circuit product can provide valuable information as to how a particular technical problem was dealt with, overall strengths and weaknesses of a design approach etc. This information can be used to make decisions regarding market positioning, future designs and new product development. The information resulting from analysis of the product is typically provided through circuit extraction (reverse engineering), functional analysis and other technical means. At the core of this activity is the process of design analysis which, in this context, refers to the techniques and methodology of deriving complete or partial schematics, starting with essentially any type of integrated circuit in any process technology. For such technical information to be of strategic value it must be accurate and cost-effective, and it is very important that the information should be timely.

A design analysis process typically involves skilled engineers manually extracting circuit information from a set of large "photomosaics" of an integrated circuit (IC). Skilled technicians and engineers perform the following sequential manual tasks:

(1) Capture Image:
  (i) a high magnification photograph is taken, using a camera, of a small portion of an IC which has been processed to expose a layer of interest.
(2) step (i) is repeated for all of various regions of interest of the layer of the IC, ensuring that sufficient overlap exists between adjacent photographs that will be used to create photomosaics.
(3) Create Photomosaics:
  (ii) all adjacent photographs associated with the given IC layer are aligned and taped together.
(4) steps (1)–(3) are repeated for all layers (I)–(N) necessary to construct a complete visual representation of the IC layers. All layers include interconnect layers. For example, foul sets of photomosaics are required for a state-of-the-art microprocessor employing four layers of interconnect: three layers of metal and one layer of polysilicon.
(5) Extract Circuit:
  (iii) transistors, logic gates and other elements employed in the IC are identified by manually visually examining the polysilicon and lower metal interconnect photomosaics.
  (iv) interconnections between circuit elements of (iii) are traced and this information is captured in the form of schematic drawings.
  (v) drawings of (iv) are manually checked against the photomosaics and any obvious errors are corrected.
(6) Organize Schematic:
  (vi) the drawings of (v) are organized into hierarchial functional/logical blocks.
(7) Capture Schematic:
  (vii) the drawings of (vi) are entered into a computer using computer aided engineering (CAE) software tools for subsequent simulation and functional analysis of the IC.

The aforenoted manual process used today has major limitations. The photomosaics alone for devices of current complexity are very expensive and can take many months to create. The circuit extraction task is labour intensive, tedious and error-prone. As IC device geometries shrink toward 0.1 micron and levels of integration move toward the equivalent of 1 billion transistors on a single device, the current manual process for full-chip design analysis will become impractical.

In order to overcome the above-described manual process, automated systems have been designed. Such systems are described in U.S. Pat. No. 5,086,477 issued Feb. 4, 1992 to Kenneth K Yu et al and U.S. Pat. No. 5,191,213 issued Mar. 2, 1993 to Haroon Ahmed et al. and also U.S. patent application Ser. No. 08/420,682.

In the system described in U.S. Pat. No. 5,086,477, the integrated circuit chip is scanned by a microscope or scanning electron microscope (SEM). The system identifies every unique cell and/or gate used in the integrated circuit. A unique abstract representation is created for each of these unique cells or gates, which are stored in a library.

However, without any operator guidance, the system cannot know where the boundary of a cell lies. While the patent suggests the use of diffusion edges to define cell boundaries, it appears that the only way that this can be done is by manual operator direction.

In the patented system, once all unique cells have been captured in a reference library, the system attempts to associate and match all abstract features contained in the layout data base to the cells in the reference library using classical template matching. However because of the magnitude of data contained in a layout data base for a typical modern integrated circuit, even after the data has been compressed, the processing time required to reliably extract a netlist is large. The difficulty and time required for the operator directed process becomes very difficult with a large number of cells or gates, since the number of template matching operations increases exponentially with the number of reference cells and/or gates.

Once all reference cells in the patented system have been template matched to the data base, theoretically all features in the layout data base will have been grouped and classified and a netlist can be constructed. If all the features of the layout data base have been classified then a netlist can be constructed. If there are features of the layout data base that have not been classified, either the system must construct a new cell or gate to be added to the reference library and an operator is informed, or the operator is informed by the system and the operator performs this task. The cell to cell interconnect information extraction, which is required to construct a netlist, is said to be performed using template matching, which is very inefficient.

Due to the template matching approach that is required, the patented system should be limited to gate-array or very structured standard cell integrated circuit analysis in which the large majority of the cells are identical, since as the number of cells in the integrated circuits increase, the efficiency decreases. It is therefore inefficient for analysis of modem ASICs or custom integrated circuits, large and/or complex integrated circuits. The patented system would also be limited to applications where many devices from a few ASIC manufacturers are investigated, due to the investment and time required to develop separate reference libraries, e.g. related to a different set of design rules.

U.S. Pat. No. 5,191,213 relates to a technique for removing layers of an integrated circuit and for scanning each of the layers.

U.S. Pat. No. 5,694,481 discloses a system which performs the following steps, in the following order: a) image capture; b) image segmentation and polygon generation; c) registering (of polygon data); d) vertical alignment; e) schematic generation. Although an improvement over the prior art this technique still has its limitations, some of them being:

1. Segmentation and polygon generation results are degraded around the boundaries of each of the images, which increased the amount of operator interaction. This could be minimized, by decreasing the perimeter to area ratio of the size of each image being captured. This minimizes the problem without solving the source.
2. Registering of polygon data is not as precise as registering of images, Although a saving is generated in terms of computing time, operator time, especially at the vertical alignment phase is increased.
3. Vertical alignment employs a potentially large search to align the different IC lavers to each other. This search involves aligning sets of contacts and vias to each other from successive layers. This task could be hampered by a number of reasons:
   i. If deprocessing was poor, contacts/vias would not necessarily be easily replicated from layer-to-layer. Contacts/vias from successive layers may not necessarily be available.
   ii. The preferred embodiment of that invention used an SEM to perform image capture. Any SEM magnification drift could not be accommodated in the previous disclosure.
   iii. The search for a match could potentially be quite time consuming since no previous knowledge of a cross-reference point was available. Additionally, due to the often repetitive nature of integrated circuits, there was a chance of aligning the layers at the wrong location. If the 'layer misalignment' threshold was set too low no match may be found.
4. No facility for correcting 'beam twist' in an SEM-like system is provided.

None of the previous techniques has the structure and advantages of the method included in the present invention.

SUMMARY OF THE INVENTION

The present invention overcomes the shortcomings of the above-described prior art manual design analysis process and the systems and processes described in the aforenoted patents by automating the entire process, including image capture, registration, circuit readback, circuit organization and schematic capture tasks. It should be understood that the entire process is not automated but rather that each portion has automation incorporated into it. For example the operator will setup the parameters for capturing the images, and an operator may also be required to correct errors that are introduced by the circuit readback. Automation presents many problems which are solved by the present invention. The present invention can provide a complete analysis of an integrated circuit design in days or weeks (depending on the size of the integrated circuit) rather than the much greater time required in the prior art processes and months in the case of the manual process.

The present invention relates to an automated system for extracting IC layout information using the following steps and criteria:

i. image capture of a highly magnified area of one layer from an integrated circuit;
ii. computer controlled stage movement to allow the capture of a subsequent image from the integrated circuit. This image has overlap with previous images in the data set. The stage movement is either highly accurate (accurate being defined as having such a small imprecision in the measurement that the measurement can be treated as exact, or very near exact), or returns a precise stage location;
iii. the image magnification and/or field-of-view are calculated from a registration of two images captured from (i) and (ii);
iv. the distortion from the beam twist is calculated from the registration results between (i) and (ii) which allows for compensation of magnetic drift effects, including magnification drift and beam twist;
v. the results of (iii) are used to calculate the precise stage movements for subsequent captures (repeating (i) and (ii) until the entire set from the layer has been captured;
vi. a fiducial mark (local landmark) is imaged which will be common for all the IC layers. The relative position between this fiducial mark and the start of data set is calculated;
vii. optionally, statistical information can be gathered and used to verify and/or reject a registration result;
viii. after registering has been completed for all edges of an image, polygons can be generated from that image using the registered data set;
ix. repeat steps (i)–(viii) for all IC layers;
x. vertically align the layer datasets with each other using the results of (vi);
xi. generate a netlist and optionally a schematic using the results of (x).

The present invention is an improvement over U.S. patent application Ser. No. 08/420,682 through the following modifications:

i. registration (mosaicking) of the images is performed using the image (pixel) data rather than the polygon data. This increases the registration accuracy and reduces operator intervention, especially at the vertical registration step;
ii. registering is performed either prior to segmentation and polygon generation or pipelined with segmentation and polygon generation, rather than after. Additionally, images with no features can be more easily registered than in Ser. No. 08/420,682;
iii. segmentation and polygon generation results are improved by using the registered image data, rather than the individual images as the input to these tasks. This effectively eliminates the image boundaries and eliminates all inaccurate polygons which would be created due to the discontinuities at the image boundaries;
iv. a highly accurate stage—either a position measurement system, or physically accurate—(with precision at least one order of magnitude greater than the minimum feature size being imaged) is used.

This allows for the following improvements:

(a) the search window for registering can be reduced since the relative positions of the images arc known, instead of known within the precision of the stage, where this position was potentially either greater, or on the order of the minimum feature size. This reduces redundant data and reduces processing time by two orders of magnitude;
(b) after one registering operation has been performed, the magnification and the field-of-view of each image is known. This allows for automatic scaling of the images if required due to drift of the SEM effective magnification;
(c) image distortion due to "beam twist" can be precisely corrected for;
(d) with the addition of a local landmark on the IC layer being imaged, the vertical registration technique presented in Ser. No. 08/420,682 does not need to be used. Instead, the positions read from the positioning system can be used to perform the vertical alignment;

(e) additionally with the addition of the "local landmark", mutual-rotation between the layer-sets can be corrected since a highly accurate stage is used.

In accordance with another object of the present invention there is provided a method of analyzing at least a portion of an integrated circuit (IC) comprising the steps of: (a) scanning at least a portion of a layer of an IC using high magnification, to obtain stored images of said portion of the IC; (b) registering the stored images; (c) creating a layout database from the stored images in the form of a set of polygons representing the IC layout of at least some of the layers; (d) repeating steps (a), (b) and (c) for plural layers of the IC; (e) registering the sets of polygons from each layer into alignment with minimal distortion; and (f) generating a netlist and/or schematic diagram of circuitry represented by at least a portion of the IC from the aligned registered sets of polygons.

In accordance with yet another object of the present invention there is provided a method of analyzing at least a portion of an integrated circuit (IC) comprising the steps of: (a) scanning at least a portion of a layer of an IC using high magnification, to obtain stored images of said portion of the IC; (b) registering the stored images; (c) creating a layout database from the stored images in the form of a set of polygons representing the IC layout of at least some of the layers; (d) repeating steps (a), (b) and (c) for plural layers of the IC; (e) registering the sets of polygons from each layer into alignment with minimal distortion.

Further objects and advantages of the present invention will be apparent from the following description, wherein preferred embodiments of the invention are clearly shown.

BRIEF DESCRIPTION OF THE DRAWINGS

A better understanding of the invention will be obtained by reading the description of the invention below, with reference to the following drawings, in which.

DETAILED DESCRIPTION OF THE INVENTION

Figure 1A:
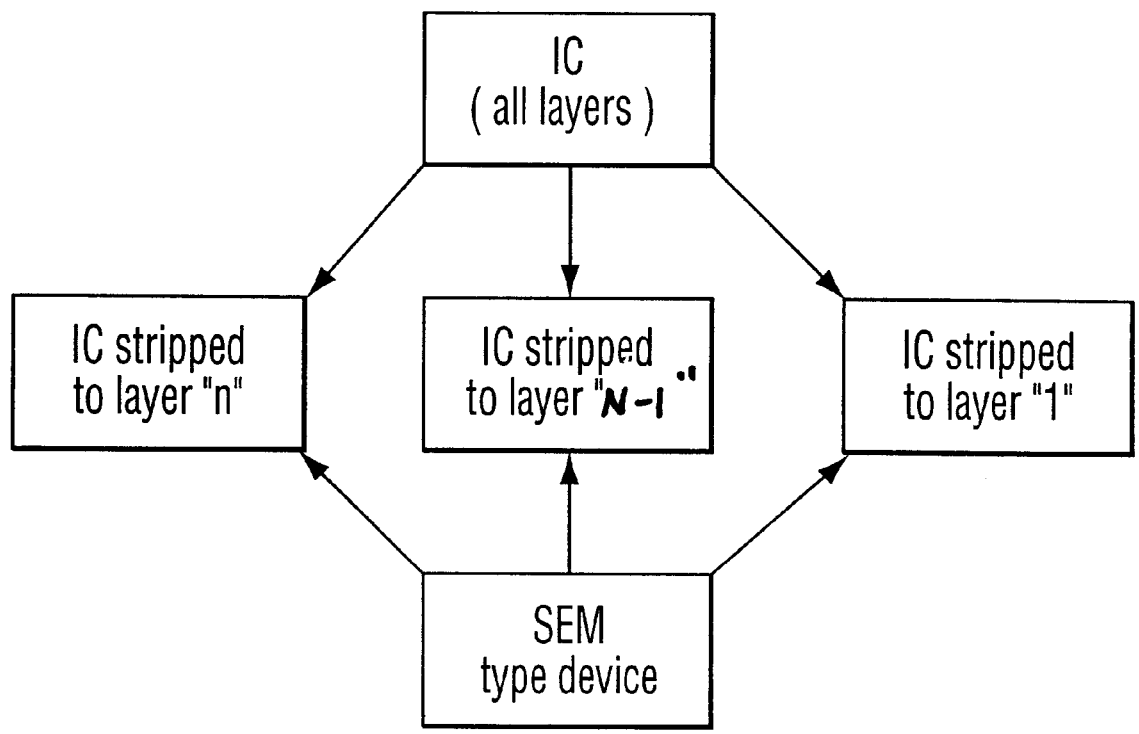
FIG. 1A illustrates multiple IC layers and a SEM device
Figure 1B:
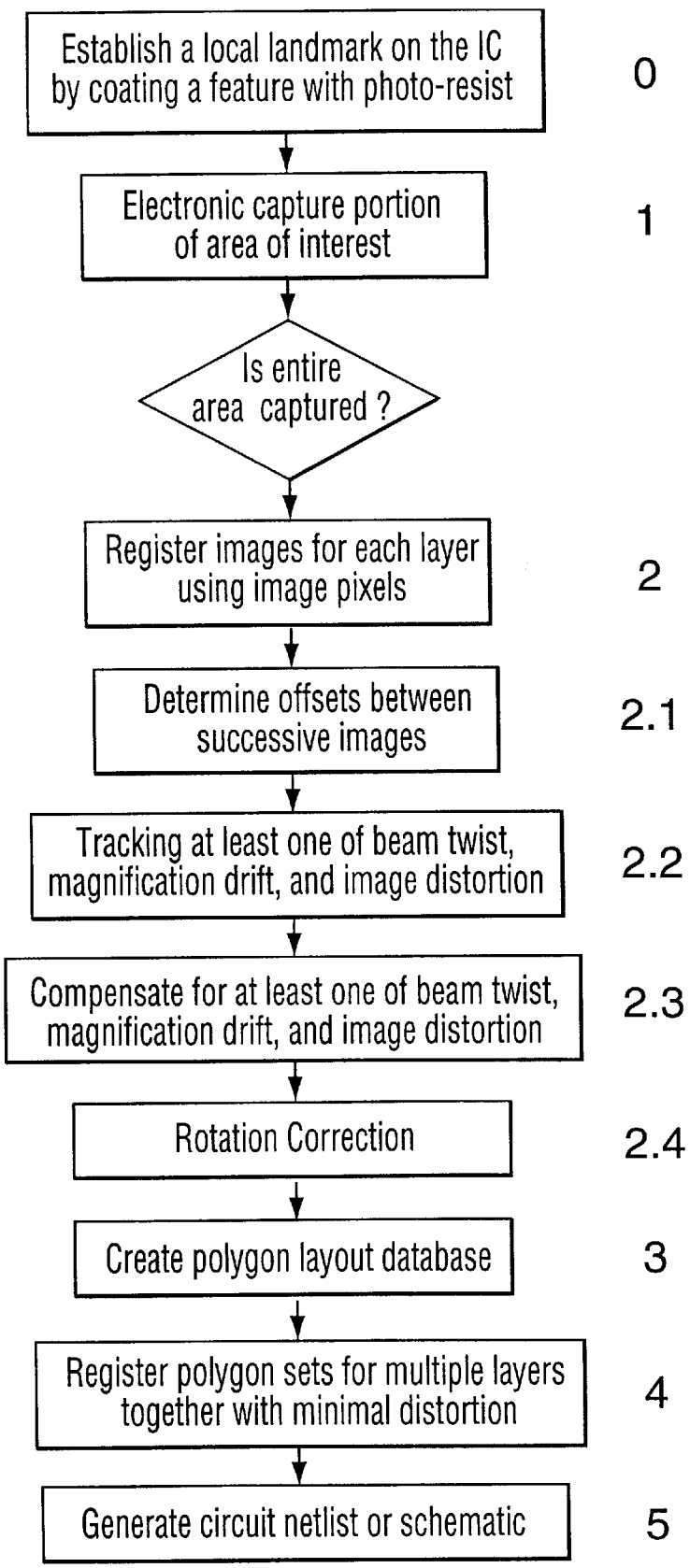
FIG. 1B is a flow chart generally illustrating the present invention.

The corresponding steps performed by the system are shown in the flow chart of FIG. 1. The system is comprised of an image acquisition apparatus 1 for acquiring electronic high magnification image sets of an IC. Once the entire area of interest has been captured, registering 2 of the images, representing each layer, is performed. The creation of polygons 3 then takes place prior to registering all layers 4 together. It should be noted that the polygons do not necessarily need to be created prior to registering all layers together. Finally, a circuit netlist is generated 5.

Registering is performed in the pixel domain instead of the polygon domain because image capture and image registration require about the same computing resources as polygon generation. This provides several advantages:

i. Registering can be performed prior to segmentation, either in parallel or pipelined with segmentation and polygon generation. This introduces a performance enhancement.

ii. High-speed accelerator boards can be employed to perform the correlation with very little engineering effort (since off the shelf routines can be employed).

iii. Sub-pixel registering techniques can be employed. By performing a registering of such high accuracy, little or no error is introduced into the placements, even in very large data-sets (grids consisting of 10000 images or more). Although this requires more computing resources, it in turn reduces the operator interaction required, especially at the vertical alignment phase.

iv. Since registering is performed before or in a pipelined fashion with segmentation/polygon generation, features at the boundary are verified by bypassing the discontinuity introduced by the image boundary.

Pixel based registering, is in general a very compute-intensive task. The task is sped up by collecting statistical information such as the mean, variance, standard deviation, integral. skewness, kurtosis, entropy, contrast etc. These statistics can be calculated very quickly. They can be calculated for the window and the template at each location as required. Predefined thresholds can be used to disable the calculation of a correlation when the templated windows are recognized as being statistically different.

The registering enhancement actually improves system performance by increasing the quality of the polygons generated (at the image boundaries) because the data from the adjacent images can be taken into consideration as well as improves the quality of the registration, thus allowing larger data-sets to be captured with less user interaction Vertical alignment is improved by performing two operations. The first operation is to reduce the search window. By selecting some feature and masking it such that subsequent sample preparation (such as chemical etches, for example) cannot effect that region, a suitable 'local landmark' exists which allows the data-sets from two separate devices (i.e. metal 1 and metal 2 layers) to be correlated to each other. A local landmark (fiducial mark) can be any feature which is visible on the top-level layer of interconnect, such as an edge seal, a pad, or an on-chip registration mark. These can be masked using standard techniques (coating the feature with photo-resist before etching the rest of the device). The global positions of the fiducial marks are known in the co-ordinate system of the stage. The global positions of the start of the data-sets from each layer are also known. By subtracting the global position of the data-sets from the global position of the fiducial mark from that layer (or vice-versa), the local coordinates of the data-sets are extracted. Within the precision of the stage, and position measurement apparatus, the relative positioning of the two data-sets are known. This can be repeated for all layers. Since the search window is actually quite small now, known procedures can be used to perform the alignment. Even a manual approach could be used.

The burden on sample preparation is also reduced using the techniques described above. Since alignment does not rely on the presence or absence of contact/via information contacts and vias need only appear on one of the layers to which they connect. Performing sample preparation such that contact/via information is reliably reproduced on two IC layers is a significant burden. Since the alignment has been performed, the classification can be performed using a simple set of rules based on metal/polysilicon/diffusion coverage of the contacts/vias. Since the IC layer from which the contacts/vias are captured from is known, the class of contact/via has been reduced to either one or two different possibilities. For example, a via captured on the M2 layer of a 2 layer metal process must be a via if it is surrounded by both M2 and M1. If vias are not imaged on M1 (due to sample preparation), the contacts, imaged with M1 must be polysilicon-metal contacts (if they are surrounded by metal 1 and polysilicon) or diffusion-metal contacts (if they are surrounded by metal 1 and diffusion). For a two metal, 1 polysilicon CMOS process contacts/vias can be imaged in any of the following scenarios without any loss of interconnection information:

i. M2-none, M1-vias, Polysilicon/Diffusion-Contact ii. M2-vias, M1-none, Polysilicon/Diffusion-Contact iii. M2-vias, M1-Contact, Polysilicon/Diffusion-none This table refers to the fact that for each main-interconnect being imaged (i.e. layer M1, M2 etc.) another layer is imaged (or not necessarily imaged) as well (i.e. layer contact, or via).

Additionally, if contacts and/or vias can be imaged on multiple layers, the numbel of combinations increases even more. Rules are added to accommodate these cases, such as looking for repeated vias between M2 and M1 or repeated contacts between diffusion/metal 1 or polysilicon and metal 1. By increasing the permutations in which contacts/vias can be imaged from the devices, the burden on sample preparation is reduced, and the quality of samples used for processing are increased.

If a highly accurate (accurate being defined as having such a small imprecision in the measurement that the measurement can be treated as exact, or very near exact) stage (or accurate position measurement system) is used, then the burden on both registering and vertical registration is reduced For example, the stage may have optical encoders which can measure the position to +/−1 micron. This is a large imprecision, for example, if the minimum feature being imaged is 0.3 microns. Using a laser interferometer, for example, to measure the stage position, the position can be determined to less than 0.05 microns of accuracy. In most cases, this precision is sufficient to just place adjacent images next to each other if the magnification is known. With standard SEM-type imaging systems, the magnification usually cannot be guaranteed to less than 5% accuracy. This potential deviation is large enough that the field size (in microns) of the captured image cannot be known to high enough accuracy. The field size (or magnification) can be known precisely by performing a registering step once in the X direction and once in the Y-direction or by imaging a known standard. Additionally, if drift in the image capture, scan electronics etc. are ignored, all subsequent images captured from a single layer can be placed in a registered set using the position read from the laser interferometer without a correlation step. Since the electronics do drift (in the case of the JEOL 5800. they drift, on average, by 0.025 microns/minute), correlations will be required for at least some images. The interval between correlations depends on the size of the image set, the magnification in which the images are being captured, and the amount of time between successive image captures.

By using the positioning system, a few advantages have been gained:

i. The number of correlations required have been significantly reduced since they do not necessarily need to be performed between every image pair. Additionally, the search window required for the correlation has been reduced in size, thus reducing the calculations at each step. Further, by tracking the drift in the electronics, even the search window at the start of the subsequent rows can be minimized.

ii. Imaging instruments like SEM's can display drifts in magnification when the critical parameters such as the working distance are varied. These drifts are difficult to correct manually. With either an accurate stage, or measurement system, these drifts can be easily calculated using the field of view extracted from the registering (without the positioning/measurement system the magnification can only be calculated to the precision of the stage and electronics). Once this value is calculated, polygon data can be quickly re-scaled using standard techniques.

Above, we justified the addition of a single fiducial mark common to all devices to allow the creation of a local-coordinate system which is common to all de-layered samples. By placing this fiducial mark at one end of the device to be imaged, and placing a second fiducial mark at a location widely separated from the first fiducial mark (ideally, as far away as possible from the first fiducial mark, or at least along the long axis of the IC), either the mutual rotation between different IC layers, or the rotation with respect to the stage or capture axes can be calculated very precisely (the baseline is very long with respect to the error in the position measurements). This angle can then be used to rotate the different image sets such that they have no rotation with respect to each other. By using a point at the center of each image, the effects of beam twist on the inaccuracy of these measurements can be minimized. Beam twist is caused by the electrons spiraling in the magnetic field of an SEM-like instrument. This twist can be simply modeled, to a first order, by a rotation of each image around the center point of the image. By measuring the angle of a straight line across a single image, and compensating for the effective rotation, beam twist can be calculated. This effective rotation can then be corrected on each and every image captured, since this angle will remain approximately constant (any tilt in the device with respect to the electron source will vary the angle slightly-but even this can be compensated for, if required, by using a measurement system to extract the tilt angle, and either zero it, or compensate for it using a scaled rotation correction). This rotation correction is applied before registering is performed. The rotation due to the stage image axes rotation can be corrected at any time after registering has been performed. Because of the precision of the positioning system of the invention, the offsets (or overlap) that are calculated between successive images (which are overlapped by a small amount) can be used to determine the magnification at which the image is captured and thereby track beam twist and any magnification drift and/or image distortion.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

The embodiments of the invention in which an exclusive property or privilege is claimed are defined as follows:

1. A method for analyzing at least a portion of an integrated circuit (IC), comprising the steps of:

(a) scanning at least a portion of a layer of the IC to obtain images of said portion of the IC, said images having pixels;

(b) registering said images together using said image pixels to form a mosaicked image of said scanned IC portion;

(c) automatically creating a layout database in the form of a set of polygons using said mosaicked image, wherein said step (c) of creating a layout database is performed after said step (b) of registering; and (d) generating a netlist or schematic using the layout database to represent the IC portion.

2. The method of claim 1, wherein said IC has a plurality of layers, the method further comprising the steps of:
(e) establishing a local landmark on said IC prior to step (a), said landmark common to all layers of said IC to be analyzed;
(f) repeating steps (a), (b), and (c) for the plurality layers of the IC, resulting in a polygon set for each of the plurality layers; and
(g) registering the polygon sets for the plurality of IC layers into alignment, prior to step (d), based on said local landmark.

3. The method of claim 1, step (b) further comprising the step of applying a rotation correction after said step (a) of scanning.

4. The method of claim 1, wherein said images in step (b) comprise successive images that overlap, said step (b) further comprising the step of determining offsets in a pixel domain between said successive images.

5. The method of claim 4, step (b) further comprising the step of tracking at least one of beam twist, magnification drift, and image distortion in said pixel domain using said offsets.

6. The method of claim 4, step (b) further comprising the step of compensating one or more of said images for at least one of beam twist, magnification drift, and image distortion in said pixel domain using said offsets, said step of compensating performed on an image-by-image basis and performed after said step (a) of scanning.

7. The method of claim 6, wherein said step of compensating comprises the step of rotating one or more of said images based on said offsets to correct for beam twist of a scanning device.

8. The method of claim 6, wherein said step of compensating comprises the step of adjusting a magnification of one or more of said images based on said offsets to correct for magnification drift between said images.

9. The method of claim 6, wherein said step of compensating is performed after, or pipelined with, said step (a) of scanning.

10. The method of claim 1, wherein said step (a) utilizes a SEM-type device to scan said IC.

11. The method of claim 1, wherein said step (b) utilizes sub-pixel techniques.

12. The method of claim 1, wherein said step (c) of creating a layout database is performed after, or pipelined with, said step (b) of registering.

13. A method for analyzing at least a portion of an integrated circuit (IC), comprising the steps of:
(a) establishing a local landmark on the IC;
(b) scanning at least a portion of a layer of the IC to obtain images of said portion of the IC, said images having pixels;
(c) registering said images together using said image pixels to form a mosaicked image of said scanned IC portion, comprising
(c1) determining offsets in a pixel domain between successive images of said scanned IC portion; and
(c2) compensating one or more of said images for at least one of beam twist and magnification drift in said pixel domain using said offsets, said step of compensating performed on an image-by-image basis and performed after said step (b) of scanning;
(d) automatically creating a layout database in the form of a set of polygons using said mosaicked image, wherein said step (d) of creating a layout database is performed after said step (c) of registering;
(e) repeating steps (b), (c), and (d) for a plurality of layers, resulting in a polygon set for each of the plurality of layers; and
(f) registering the polygon sets into alignment using said local landmark.

14. The method of claim 13 wherein step (a) comprises the step of coating a feature on the IC with photo-resist.

15. The method of claim 13, wherein said step (b) utilizes a SEM-type device to scan said IC.

16. The method of claim 13, further comprising the step of generating a netlist or schematic using the polygon database.

17. The method of claim 13, wherein step (c) utilizes sub-pixel techniques.

18. The method of claim 13, wherein said step (d) of automatically creating a layout database is performed after, or pipelined with, said step (c) of registering.

19. The method of claim 13, wherein said step (c2) of compensating is performed after, or pipelined with, said step (b) of scanning.

20. The method of claim 13, wherein said step of compensating comprises the step of rotating one or more of said images based on said offsets between images to correct for beam twist of a scanning device.

21. The method of claim 13, wherein said step of compensating comprises the step of adjusting a magnification of one or more of said images based on said offsets between images to correct for magnification drift between said images.

22. A method for analyzing at least a portion of a semiconductor integrated circuit, comprising the steps of:
(a) establishing a local landmark on said IC, said landmark common to all layers to be analyzed, said landmark having a known position;
(b) scanning at least a portion of one or more IC layers to obtain images of the IC layers, said images containing pixels;
(c) registering said images in step (b) using said image pixels, the registered images having a known position, comprising
(c1) determining offsets in a pixel domain between successive images of said scanned IC portions;
(c2) rotating one or more of said images in said pixel domain based on said offsets to compensate for beam twist incurred during said scanning step, said step of rotating performed on an image-by-image basis and performed after said step (b) of scanning; and
(c3) adjusting a magnification of one or more of said images based on said offsets to compensate for magnification drift between said images, said step of adjusting magnification performed on an image-by-image basis and performed after said step (b) of scanning;
(d) repeating steps (b) and (c) for a plurality of layers of the IC; and
(e) aligning the registered images for the plurality of IC layers using the known position of the local landmark and the known position of registered images.

23. The method of claim 22, wherein step (e) comprises the step of subtracting the known position of the registered images from the known position of the local landmark.

24. A method for analyzing at least a portion of an integrated circuit (IC), comprising the steps of:
(a) scanning at least a portion of a layer of the IC using a SEM device to obtain images of said scanned IC portion, said images having pixels;

(b) horizontally registering said scanned images together using said image pixels to form a mosaicked image of said scanned IC portion, comprising
  (b1) determining offsets in a pixel domain between successive images of said scanned IC portions;
  (b2) rotating one or more of said images in said pixel domain based on said offsets to compensate for a beam twist associated with said SEM device; and
  (b3) adjusting a magnification of one or more of said images based on said offsets to compensate for magnification drift associated with said SEM device;
(c) automatically creating a layout database in the form of a set of polygons using said mosaicked image, wherein said step (c) of creating a layout database is performed after said step (b) of registering;
(d) repeating steps (a), (b), and (c) for a plurality of layers, resulting in a polygon set for each of the plurality of layers;
(e) vertically registering the polygon sets into alignment using a local landmark on the IC; and
(f) generating a netlist or schematic using the layout database to represent the IC portion.

25. A method for analyzing at least a portion of an integrated circuit (IC), comprising the steps of:
(a) establishing a first and second local landmarks on the IC;
(b) scanning at least a portion of a layer of the IC using a scanning electron microscope (SEM) device to obtain images of said portion of the IC, said images having pixels, said scanning step comprising the step of determining a location of said SEM device at a stage location to an accuracy that is at least an order of magnitude greater than a smallest feature size on said IC;
(c) registering said images together using said image pixels to form a mosaicked image of said scanned IC portion, comprising
  (c1) determining an offset between successive images based on said landmarks;
  (c2) rotating one or more of said images based on said offset to compensate for beam shift; and
  (c3) adjusting a magnification of one or more of said images based on said offset to compensate for magnification drift between said images;
(d) automatically creating a layout database in the form of a set of polygons using said mosaicked image, wherein said step (d) of creating a layout database is performed after said step (c) of registering;
(e) repeating steps (b), (c), and (d) for a plurality of layers, resulting in a polygon set for each of the plurality of layers; and
(f) registering the polygon sets into alignment using said local landmark.

* * * * *